(12) United States Patent
Harris et al.

(10) Patent No.: US 10,450,937 B2
(45) Date of Patent: Oct. 22, 2019

(54) APPARATUS AND METHOD OF PRODUCING INSULATION PREFORM WITH GRADED POROSITY

(71) Applicant: Tenneco Automotive Operating Company Inc., Lake Forest, IL (US)

(72) Inventors: Thomas M. Harris, Jackson, MI (US); Bradley Fingland, Jackson, MI (US); Michael C. Bradford, Chelsea, MI (US); Adam J. Kotrba, Laingsburg, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 387 days.

(21) Appl. No.: 15/386,126

(22) Filed: Dec. 21, 2016

(65) Prior Publication Data

US 2018/0171857 A1 Jun. 21, 2018

(51) Int. Cl.
*F01N 13/14* (2010.01)
*C04B 28/26* (2006.01)
*C04B 38/00* (2006.01)
*C04B 111/00* (2006.01)
*C04B 111/28* (2006.01)

(52) U.S. Cl.
CPC .......... *F01N 13/148* (2013.01); *C04B 28/26* (2013.01); *C04B 38/0064* (2013.01); *C04B 2111/00793* (2013.01); *C04B 2111/28* (2013.01); *F01N 2310/12* (2013.01)

(58) Field of Classification Search
CPC ... F01N 13/148; F01N 2310/12; C04B 28/26; C04B 38/0064; C04B 2111/00; C04B 2111/28
See application file for complete search history.

(56) References Cited

U.S. PATENT DOCUMENTS

| | | | |
|---|---|---|---|
| 2,600,812 A | 6/1952 | Thomas et al. |
| 3,042,578 A | 7/1962 | Denning |
| 3,515,624 A | 6/1970 | Garnero |
| 3,522,067 A | 7/1970 | MacArthur |
| 3,590,111 A | 6/1971 | Gebefugi |

(Continued)

OTHER PUBLICATIONS

Grace Davison Article entitled Materials & Packaging Technologies believed to be available on or before 2008.

*Primary Examiner* — Michael C Miggins
(74) *Attorney, Agent, or Firm* — Harness, Dickey & Pierce, P.L.C.

(57) ABSTRACT

The present disclosure provides a method of producing an insulation preform having graded porosity for an exhaust treatment component of a vehicle. The method includes obtaining a first granular insulating material having a first diameter, a second granular insulating material having a second diameter less than the first diameter, an inorganic binder, and water. The method further includes producing a slurry comprising the first granular insulating material, the second granular insulating material, the inorganic binder, and water. The slurry is introduced into a mold having at least one surface adapted for vacuum extraction. A liquid phase of the slurry is evacuated from the mold using vacuum extraction to produce a moist preform. The moist preform has graded porosity such that a greater concentration of the second insulation material is adjacent to the at least one surface than the first insulating material. The moist preform is heated to produce the insulation preform.

7 Claims, 6 Drawing Sheets

(56) References Cited

U.S. PATENT DOCUMENTS

| | | |
|---|---|---|
| 3,658,564 A | 4/1972 | Gerow et al. |
| 3,718,491 A | 2/1973 | Yates |
| 3,769,065 A | 10/1973 | Dunn |
| 4,011,651 A | 3/1977 | Bradbury et al. |
| 4,069,284 A | 1/1978 | Niimi et al. |
| 4,138,268 A | 2/1979 | Vogel et al. |
| 4,288,253 A | 9/1981 | Venable |
| 4,304,704 A | 12/1981 | Billings |
| 4,664,712 A | 5/1987 | Cisneros |
| 5,013,501 A | 5/1991 | Fukao et al. |
| 5,693,274 A | 12/1997 | Kim |
| 5,937,643 A | 8/1999 | Wang |
| 6,349,542 B1 | 2/2002 | Moore, III |
| 6,725,656 B2 | 4/2004 | Moore, III et al. |
| 6,726,884 B1 | 4/2004 | Dillon et al. |
| 6,749,942 B1 | 6/2004 | Wittenauer et al. |
| 7,118,802 B2 | 10/2006 | Simon et al. |
| 8,336,673 B2 | 12/2012 | Zanzie et al. |
| 8,652,599 B2 | 2/2014 | Braunreiter et al. |
| 9,260,064 B2 | 2/2016 | Shives et al. |
| 2014/0161677 A1 | 6/2014 | Latham et al. |
| 2014/0183401 A1 | 7/2014 | Goletto et al. |
| 2015/0000259 A1 | 1/2015 | Dietz |
| 2016/0084140 A1 | 3/2016 | Dietz |

APPARATUS AND METHOD OF PRODUCING INSULATION PREFORM WITH GRADED POROSITY

FIELD

The present disclosure relates to exhaust treatment systems, and more specifically, to insulation for an exhaust treatment device and methods of making thereof.

BACKGROUND

This section provides background information related to the present disclosure which is not necessarily prior art.

In an attempt to reduce the quantity of $NO_x$ and particulate matter emitted to the atmosphere during internal combustion engine operation, a number of exhaust aftertreatment or emission control devices ("exhaust treatment devices") have been developed. A need for exhaust aftertreatment systems particularly arises when diesel combustion processes are implemented. Typical aftertreatment systems for diesel engine exhaust may include a hydrocarbon (HC) injector, a diesel oxidation catalyst (DOC), a diesel particulate filter (DPF), and a selective catalytic reduction (SCR) system (including a urea injector).

Exhaust treatment systems may include insulation to retain heat within the exhaust treatment devices or for shielding temperature-sensitive components or materials that are located nearby. The insulation may be disposed between two walls. An inner wall defines a passage for exhaust gas flow and an outer wall retains the insulation and protects it from the environment.

SUMMARY

This section provides a general summary of the disclosure, and is not a comprehensive disclosure of its full scope or all of its features.

In accordance with an aspect of the subject disclosure, a method of producing an insulation preform having graded porosity for an exhaust treatment component of a vehicle is provided. The method includes obtaining a first granular insulating material having a first particle diameter, a second granular insulating material having a second particle diameter less than the first diameter, an inorganic binder, and water. The method further includes producing a slurry comprising the first granular insulating material, the second granular insulating material, the inorganic binder, and the water. The slurry is introduced into a mold having at least one surface adapted for vacuum extraction. A liquid phase of the slurry is evacuated from the mold using vacuum extraction to produce a moist preform. The moist preform has graded porosity such that a greater concentration of the second insulation material is adjacent to the at least one surface than the first insulating material.

In another aspect of the subject disclosure, an insulation preform having graded porosity for an exhaust treatment system of a vehicle is provided. The insulation preform comprises a plurality of first particles and a plurality of second particles. Each first particle of the plurality comprises an insulating material and has a first mean particle size. Each second particle of the plurality comprises the insulating material and has a second mean particle size. The second mean particle size is less than the first mean particle size. The insulation preform includes a first region having a first porosity and a second region having a second porosity less than the first porosity. The second region comprises more of the second particles of the plurality than the first region. The first region comprises more of the first particles of the plurality than the second region.

In still another aspect of the subject disclosure, an insulating component for an exhaust treatment component of a vehicle is provided. The insulating component includes an outer wall, an inner wall that is at least partially disposed within the outer wall, and an insulation preform disposed between the outer wall and the inner wall. The insulation preform comprises a first region having a first density and a second region having a second density that is greater than the first density. The second region of the insulation preform is adjacent to a surface of the inner wall. The first region of the insulation preform is adjacent to a surface of the outer wall. The inner wall is adapted to be disposed around an outer surface of the exhaust treatment component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
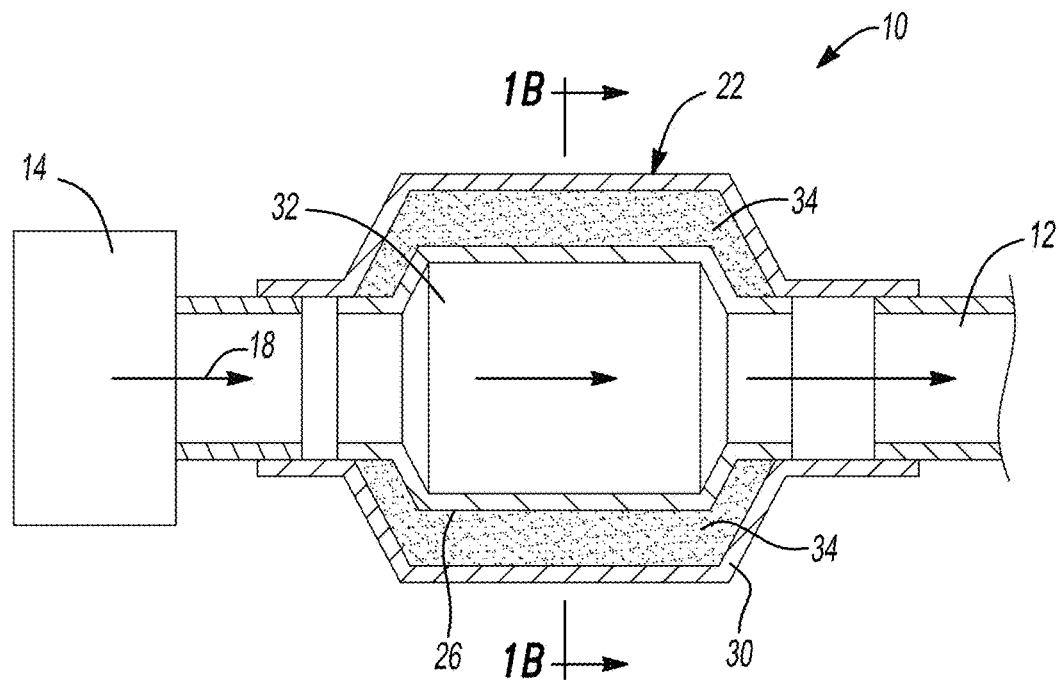
FIG. 1A is a partial schematic view of an exhaust system including an exhaust treatment device according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure is directed to an exhaust system, and more particularly, to an insulation preform for an exhaust treatment device. Referring to FIG. 1A, an exhaust system 10 is provided. The exhaust system 10 includes an exhaust gas passageway 12 and a combustion engine 14 that generates exhaust gas 18. The exhaust system 10 also includes at least one exhaust treatment device 22 in fluid communication with the exhaust gas passageway 12. Exhaust treatment devices 22 may include catalytic converters, diesel oxidation catalysts (DOC), diesel particulate filters (DPF), gasoline particulate filters (GPF), lean $NO_x$ traps, selective catalytic reduction (SRC) catalysts, burners, manifolds, connecting pipes, mufflers, resonators, tail pipes, emission control system enclosure boxes, insulation rings, insulated end cones, insulated inlet pipes, and insulated outlet pipes, by way of non-limiting example. While the insulation preform of the present disclosure is particularly useful in the above applications, it can be generally used in applications involving temperatures of less than or equal to the softening temperature of the insulation material used.

Figure 1B:
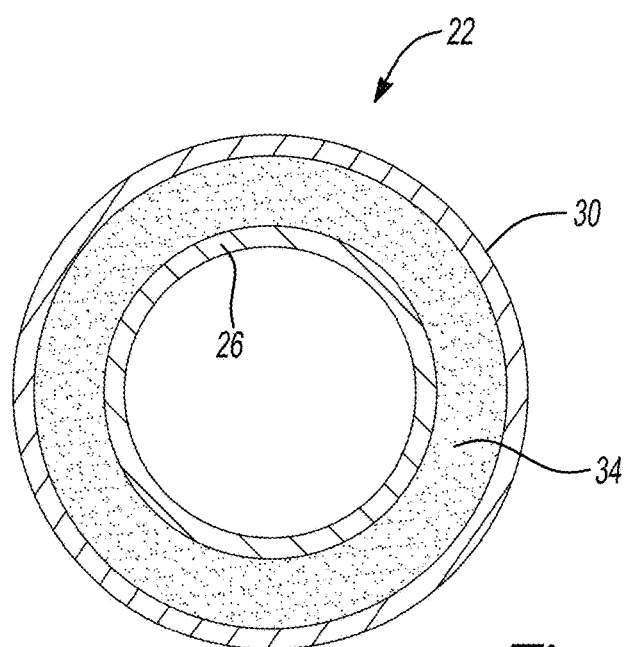
FIG. 1B is a cross-sectional view of the exhaust treatment device of FIG. 1A taken at line 1B-1B.

With reference to FIGS. 1A-1B, the exhaust treatment device 22 includes an inner wall 26, and outer wall 30, a substrate 32, and insulation 34 disposed between the inner wall 26 and the outer wall 30. The exhaust treatment device 22 is generally cylindrical.

Figure 2:
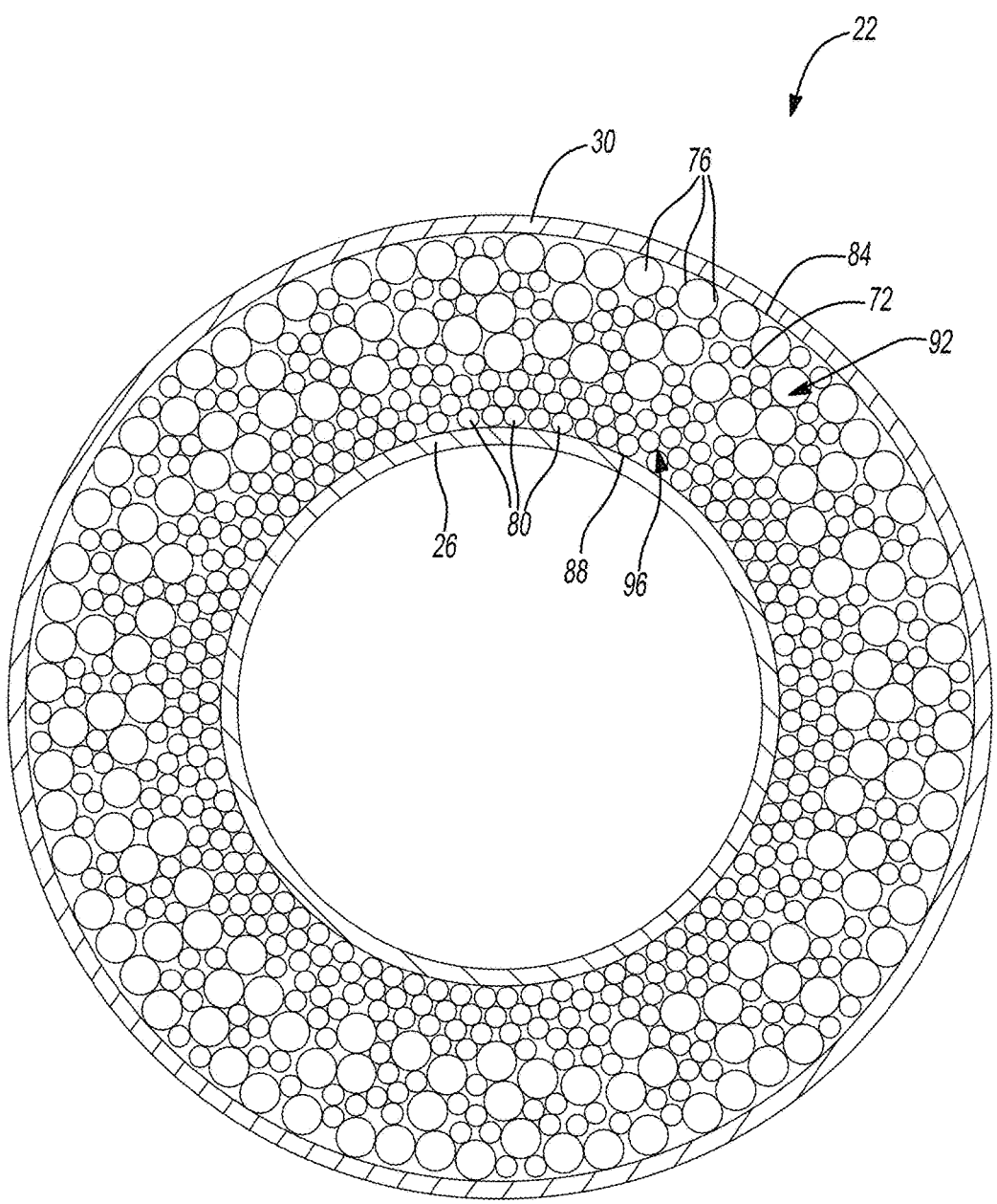
FIG. 2 is an enlarged cross-sectional view of the exhaust treatment device of FIG. 1B.

Referring now to FIG. 2, insulation 34 of exhaust treatment device 22 is depicted in greater detail. Insulation 34 may be initially constructed as an insulation preform 72. The insulation preform 72 includes a plurality of first particles 76 and a plurality of second particles 80. The plurality of first particles 76 has a first mean diameter and the plurality of second particles 80 has a second mean diameter. The first mean diameter is greater than the second mean diameter. The plurality of first particles 76 has a first density and the plurality of second particles 80 has a second density. The second density may be different than the first density.

The plurality of first particles comprises a first granular insulating material and the plurality of second particles comprises a second granular insulating material. The first and second insulating materials may be the same. For example, the first and second insulating materials may each comprise perlite. The first and second insulating materials may be different. For example, the first insulating material may comprise a lower density insulating material, such as perlite, and the second insulating material may comprise a higher density material that is capable of infrared reflection, such as silicon carbide (SiC), titanium dioxide ($TiO_2$), or a mixture thereof.

The insulation preform 72 has a radially-graded porosity extending between a first or outer surface 84 and a second or inner surface 88. Insulation adjacent to the first surface 84 has a first porosity that is greater than a second porosity of insulation adjacent to the second surface 88. Thus, insulation adjacent to the first surface 84 has a first density that is less than a second density of insulation adjacent to the second surface 88. The first surface 84 is adjacent to the outer wall 30 and the second surface 88 is adjacent to the inner wall 28. Thus, the second surface 88 is oriented toward the exhaust gas passage or the "hot surface," while the first surface 84 is oriented toward the "cold surface."

A graded porosity in an insulation preform is advantageous in minimizing heat loss from the exhaust treatment device. A first region 92 adjacent to the cool surface is dominated by heat transfer through conduction. The relatively low first density and relatively high first porosity are effective in limiting conduction. More specifically, the air-filled pores of the high porosity layer increase thermal resistance, and therefore decrease conduction. A second region 96 adjacent to the hot surface is dominated by heat transfer by radiation through reflection and absorption. The relatively high second density and relatively low second porosity are advantageous in attenuating radiation.

Figure 3:
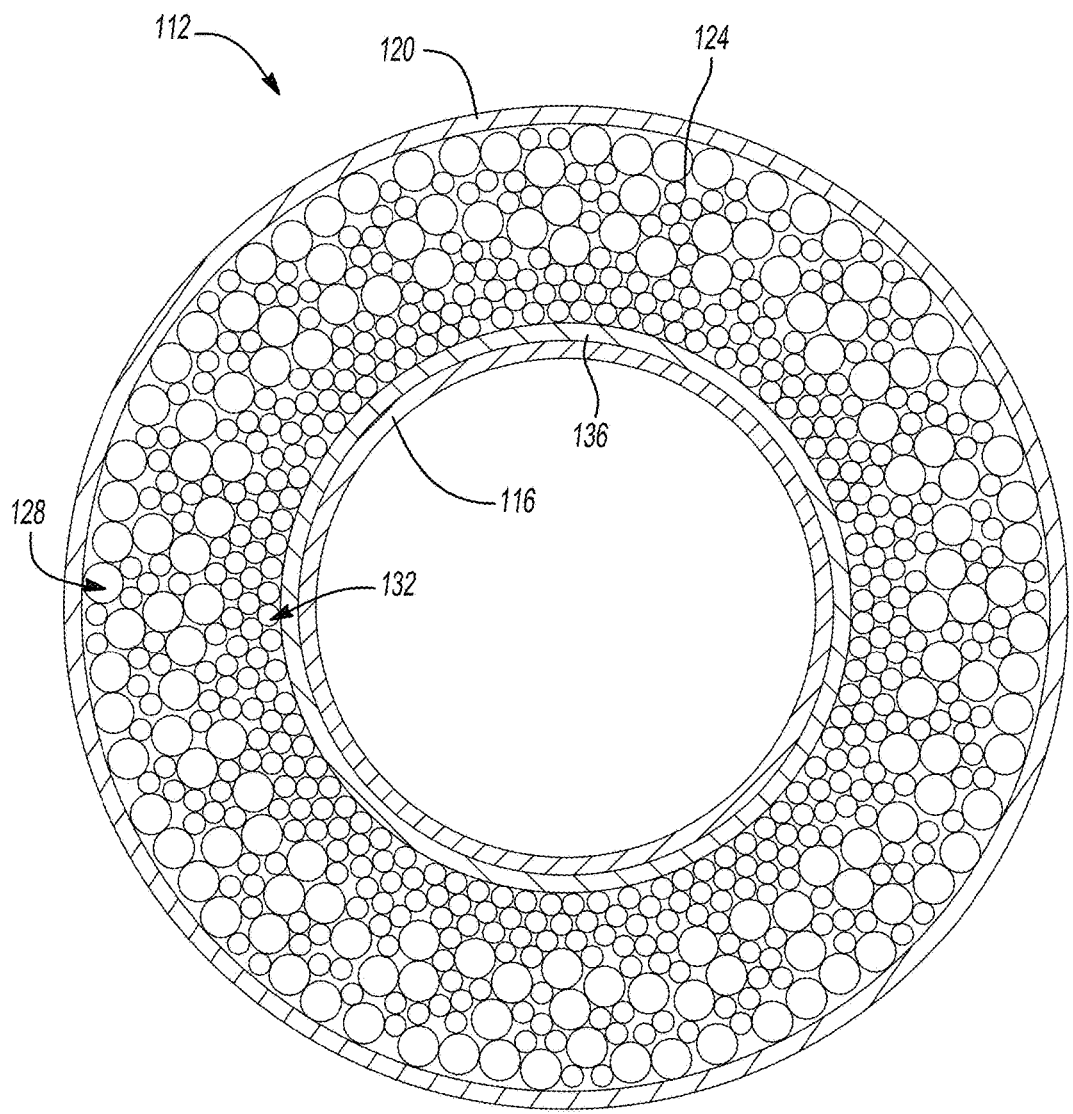
FIG. 3 is a cross-section of an exhaust treatment device including insulation having a shell according to the present disclosure.

Referring to FIG. 3, the present disclosure also provides an alternate exhaust treatment device 112 having an inner wall 116, an outer wall 120, and an insulation preform 124 disposed between the inner wall 116 and the outer wall 120. The insulation preform 124 includes a radially-graded porosity, similar to the insulation preform 72 of FIG. 2. The insulation preform 124 includes a first lower density region 128 and a second higher density region 132. The insulation preform 124 also includes a shell 136 adjacent to the inner wall 116. The shell 136 increases the robustness of the insulation preform 124 by improving resistance to thermal and mechanical stresses. The shell 136 has a third density that may be greater than the first density and the second density. Thus, the high density shell 136 may further reduce radiative heat transfer when compared to an insulation preform without a shell. As one example, shell 136 may comprise a water-permeable scrim such as a cotton or flax textile, a binder, and insulation particles.

Figure 4:
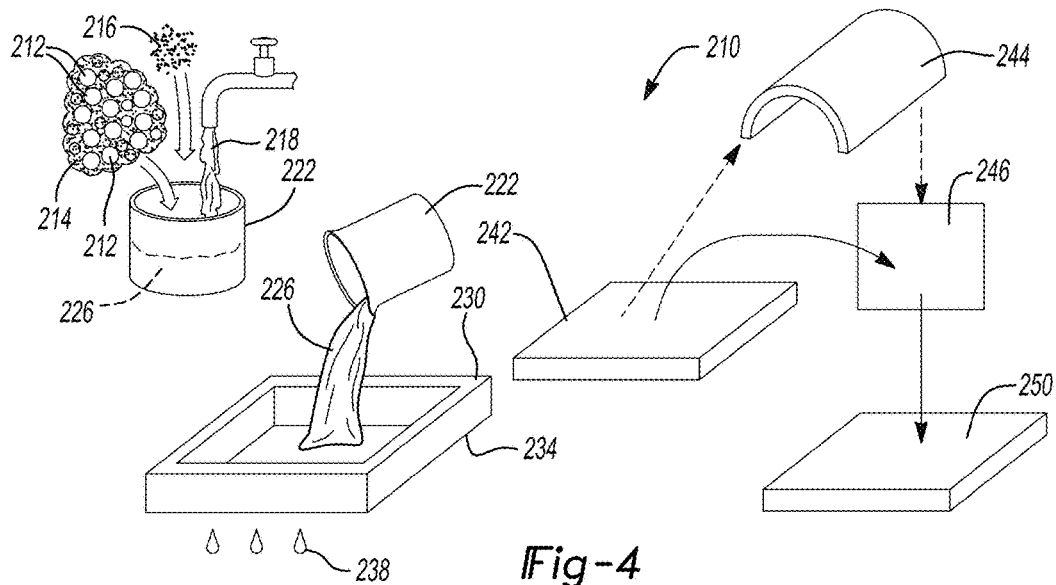
FIG. 4 is a schematic view of a manufacturing process for an insulation preform according to the present disclosure.
Figure 5:
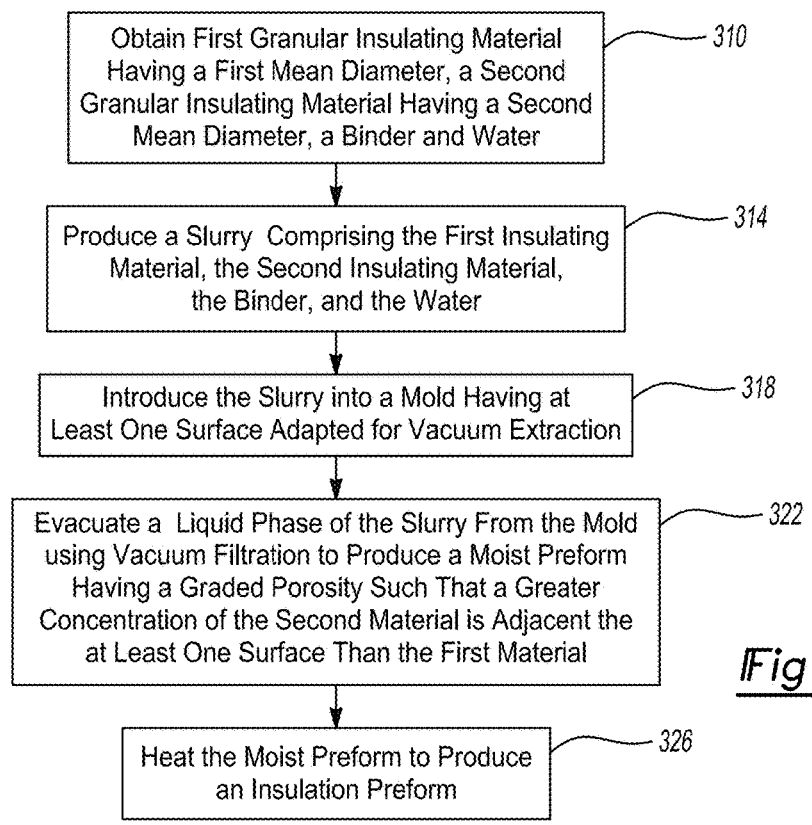
FIG. 5 is a flow chart of the manufacturing process of FIG. 4 according to the present disclosure.

With reference to FIGS. 4-5, the present disclosure provides manufacturing process 210 for an insulation preform. The process 210 includes combining first and second granular insulating materials 212, 214, a binder 216, and water 218 in a tank 222 to form a slurry 226. Although the first and second granular insulating materials 212, 214 are shown mixed, they may also be added to the tank 222 separately. In one example, water 218 is added to the tank 222, then an admixture of first and second granular insulating materials 212, 214 is added to the tank, then the binder 216 is added to the tank 222. In another example, the water 218 and the binder 216 are premixed and added to the tank 222, then the first and second granular insulating materials 212, 214 are added to the tank 222. Other combinations and orders of addition of first and second granular insulating materials 212, 214, binder 216, and water 218 are contemplated within the scope of the present disclosure.

The slurry 226 is poured into a mold 230 having at least one surface 234 adapted for vacuum extraction. Vacuum extraction is performed to remove a liquid phase 238 from the at least one surface 234 of the mold 230 to form a moist preform 242. The moist preform 242 is optionally shaped into a shaped moist preform 244. The moist preform or shaped moist preform 242, 244 is placed in an oven 246 to be dried or fired, thereby creating an insulation preform 250.

The present disclosure also provides a method of manufacturing a graded porosity insulation preform. Referring to FIG. 5, at 310, the method includes obtaining a first granular insulating material, a second granular insulating material, an inorganic binder, and water.

In one example, the first and second granular insulating materials are the same composition. A particle size distribution can be unimodal or bimodal. In certain aspects, a size distribution of first and second particles is unimodal, or has a single peak in size distribution. The particle size distribution is broad and includes a highest concentration of intermediate sized particles. For example, RYOLEX® grade 1 perlite may be used for the first and second insulating materials. The plurality of first particles has a first mean diameter and a first size range, and the plurality of second particles has a second mean diameter that is less than the first mean diameter and a second size range that overlaps or is adjacent to the first size range. Grade 1 perlite comprises a broad range of particle sizes of greater than or equal to about 0.15 mm diameter and less than or equal to about 2.4 mm diameter.

In other aspects, the size distribution of first and second particles may be bimodal, or having two peaks in size distribution. Thus, there are first and second particle size distributions. The particles of the first distribution are generally larger than the particles of the second distribution. Particle size ranges in the first distribution and the second distribution may or may not overlap. In some examples, the first mean diameter is greater than or equal to about 1 mm and less than or equal to about 3.5 mm and the second mean diameter may be greater than or equal to about 0.07 mm and less than or equal to about 0.7 mm. More specifically, by way of non-limiting example, the first insulating may comprise RYOLEX® grade 5 Perlite having a diameter range of greater than or equal to about 1.18 mm and less than or equal to about 3.4 mm. The second insulating material may comprise RYOLEX® grade 39 Perlite having a diameter range of greater than or equal to about 0.074 mm and less than or equal to 0.6 mm.

In another example the first and second insulation materials have distinct compositions and particle densities. The first material has a first composition and a first density. The second material has second distinct composition and a distinct second density that is greater than the first density. The first density may be much smaller than the second density. The first density may be greater than or equal to about 30 kg/m$^3$ and less than or equal to about 150 kg/m$^3$. The second density may be greater than or equal to about 500 kg/m$^3$ and less than or equal to about 3500 kg/m$^3$. For example, the first material may comprise perlite having a density of about 48 kg/m$^3$ and the second material may comprise silicon carbide (SiC) having a density of 3200 kg/m$^3$. The second material may also have a second mean particle diameter that is less than a first mean particle diameter of the first material. The second material is capable of reflecting or adsorbing infrared radiation more effectively than the first material. By way of non-limiting example, suitable second materials include silicon carbide (SiC) and titanium dioxide (TiO$_2$).

The binder provides the insulation preform with increased strength through greater connectivity between insulation particles. Suitable binders include sodium silicate and colloidal silica, by way of non-limiting example. The binder may be an organo-silicon compound. That is, a polymer formed by a reaction of different cation-containing precursors with suitable organic solvents, such as ethylene glycol or butoxy-ethanol. These compounds decompose to form a corresponding inorganic oxide (e.g., silica or perlite) that cements the perlite granules together.

At 314, the first and second granular insulating materials, inorganic binder, and water are combined to form a slurry. In some examples, the slurry comprises greater than or equal to 15% and less than or equal to 50% solids by mass. The liquid phase of the slurry carries the binder. Thus, liquid content can be minimized to control binder consumption and cost.

At 318, the slurry is introduced into a mold. The mold has at least one surface adapted for vacuum extraction. However, the mold may have multiple surfaces adapted for vacuum extraction. The mold may be flat, or shaped to complement an exhaust treatment device. For example, a semi-cylindrical mold may be used to create half of an insulation preform.

At 322, the liquid phase of the slurry is evacuated from the mold using vacuum extraction to produce a moist preform having graded porosity such that a greater concentration of the second granular insulating material is adjacent to the at least one surface adapted for vacuum extraction than the first granular insulating material. Particles that have smaller diameters, higher densities, or both are concentrated at the extraction surface because they are transported there by the liquid phase as it percolates through the at least one surface adapted for vacuum extraction. The graded porosity can be achieved in a single extraction step under the influence of gravity and without agitation or mixing during extraction. The single-step process is advantageous in minimizing time and cost of the manufacturing process. Steps 318 and 322 may optionally be performed concurrently.

At 326, the moist preform is heated to facilitate evaporation of the water. By way of non-limiting example, when the first and second insulating materials comprise perlite, the moist preform is heated to a temperature greater than or equal to about 80° C. and less than or equal to about 871° C., the softening temperature of perlite. The moist preform is optionally heated to greater than or equal to about 500° C., or calcined, to impart additional rigidity and durability.

The method may optionally include lining the mold with a semi-permeable barrier. Suitable semi-permeable barriers include conventional filter paper and woven fabric scrim, by way of non-limiting example. Scrims are lightweight and may be made from textiles such as cotton or flax. Scrims facilitate vacuum extraction by retaining solid particles as the liquid phase is removed in a perpendicular direction. A scrim also helps to maintain the shape of the moist preform as it is removed from the mold prior to drying or firing. Flexible scrim sheets are particularly useful in removing the moist preform from the mold.

The method may optionally include the use of one or both of a viscosifier or a wetting agent in the slurry. These additives are used to modify the behavior of the slurry. For example, to suspend large insulation granules. Viscosifiers and wetting agents are organic materials that will burn off during calcining, or at temperatures greater than or equal to about 500° C.

In one aspect, the present disclosure provides a method of manufacturing an insulation preform having a shell or skin adjacent to the higher density region. The method includes steps 310, 314, 318, 322, and 326, as described above and in FIG. 5. The method includes an additional step of lining the mold with a semi-permeable barrier such as a filter paper or scrim that is operable to absorb at least a portion of the liquid phase. As in the process of FIG. 5, fine particles accumulate at an adjacent surface of the scrim. The fine particles and the binder become trapped in the scrim. When the moist preform is subsequently dried or fired, the trapped fine particles and binder form a hard surface or shell. The shell enhances durability of the insulation preform. The shell also improves heat transfer properties of the insulation preform because it has an increased density compared to adjacent filter material and therefore it facilitates reflection of heat back toward the hot surface. Thus, the shell increases the robustness of the insulation preform and makes it more resistant to thermal and mechanical stresses experienced in automotive and commercial vehicle applications.

In another aspect, the present disclosure provides a method of shaping a moist preform. The method includes steps 310, 314, 318, 322, and 326, as described above and in FIG. 5. The method further includes placing a filter paper or scrim into the mold prior to introduction of the slurry. After evacuation of the liquid phase, the scrim sheet is used to facilitate removal of the moist preform from the mold. The moist flexible preform can readily be formed to complement the exhaust treatment device or accommodate manufacturing tolerances in the exhaust treatment device. The moist preform and scrim sheet are manipulated into a final shape required by the exhaust treatment device. For example, the moist preform may be shaped into a hollow cylinder or semi-cylinder. The scrim sheet may be subsequently removed by burning it off during firing.

In still another aspect, the present disclosure provides a method of manufacturing an insulation preform in situ. The method includes obtaining a first granular insulating material having a first mean diameter, a second granular insulating material having a second mean diameter smaller than the first mean diameter, a binder, and water. The first material, the second material, the binder, and water are mixed to form a slurry. The slurry comprises greater than or equal to about 15% and less than or equal to about 80% solids by mass, optionally greater than or equal to about 50% and less than or equal to about 70%. The slurry is introduced to into a space between an inner wall and an outer wall of an exhaust treatment device, but is not fully sealed into the space. The slurry is forced into the space by hydraulic pressure, for example, with a syringe pump. The slurry is heated together with the exhaust treatment component to a temperature greater than or equal to about 80° C. and less than or equal to about 120° C. to evaporate the water in the slurry.

Steps of the above methods may be performed in combination within the scope of the present disclosure.

EXAMPLE 1

Figure 6:
FIG. 6 is a chart of granular insulation particle sizes used in Example 1.

A slurry is created using 15 grams granular insulation material, 22 grams binder, and 53 grams water. The granular insulation material comprises perlite, and more specifically, RYOLEX® 1-NR from Silbrico. Grade 1-NR perlite comprises a distribution of particle sizes shown in FIG. 6 at 410. The US standard mesh size is shown at 414, 418 indicates the particle size in millimeters (mm) corresponding to the US standard mesh size. The distribution of particle size for grade NR-1 is shown at 424. The binder is sodium metasilicate nonahydrate ($NA_2SiO_3.9H_2O$) at 99.8% purity from Spectrum Chemical.

Figure 7A:
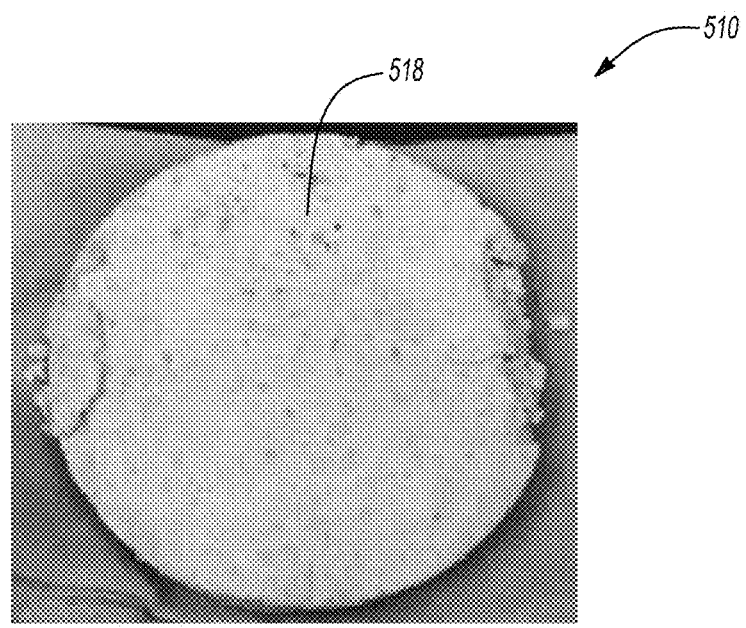
FIG. 7A is a photo of a top view of an insulation preform according to the present disclosure.
Figure 7B:
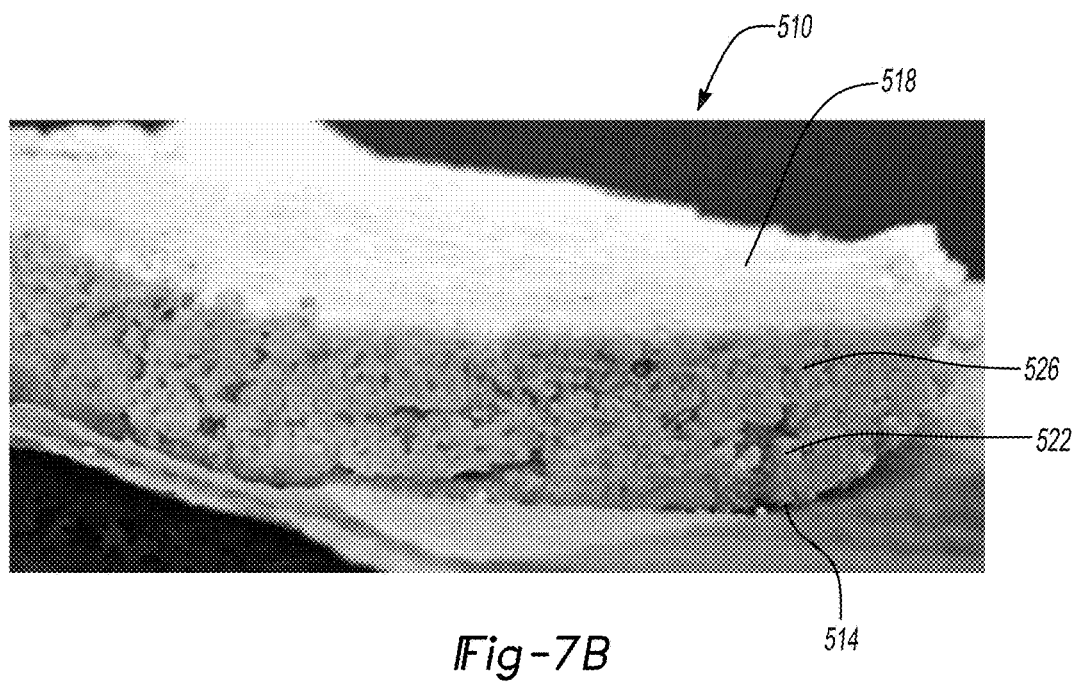
FIG. 7B is a perspective view of the insulation preform of FIG. 7A.

A 9-cm diameter filter paper is placed into a vacuum filtration funnel. The slurry is added to the vacuum filtration funnel. Vacuum is applied by means of a hand-operated pump equipped with a gauge. Vacuum filtration of the slurry creates a moist preform. The moist preform is dried overnight, or for about 16 hours, at 80° C. Drying produces an insulation preform as shown in FIGS. 7A-7B. The insulation preform is shown at 510. It includes a bottom surface 514 and a top surface 518. The top surface has a higher density and a lower porosity than the bottom surface. Thus, a porosity gradient extends between the top surface and the bottom surface. A higher porosity region 522 is adjacent to the bottom surface 514 and a lower porosity region 518 is adjacent to the top surface 518.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An insulation preform having graded porosity for an exhaust treatment system of a vehicle, the insulation preform comprising:
   a plurality of first particles, each first particle comprising an insulating material and having a first mean particle size; and
   a plurality of second particles, each second particle comprising the insulating material and having a second mean particle size, wherein the second mean particle size is less than the first mean particle size, wherein:

the insulation preform includes a first region having a first porosity and a second region having a second porosity less than the first porosity;

the first region comprises more of the first particles of the plurality than the second region; and the second region comprises more of the second particles of the plurality than the first region.

2. The insulation preform of claim 1, wherein:

each first particle of the plurality has an mean diameter that is greater than or equal to about 1 mm and less than or equal to about 3.5 mm; and each second particle of the plurality has a mean diameter that is greater than or equal to about 0.5 mm and less than or equal to about 0.08 mm.

3. The insulation preform of claim 1, further comprising a shell disposed adjacent to the second region, wherein the shell has a hardness that is greater than the hardness of the second region.

4. The insulation preform of claim 1, wherein the insulating material comprises perlite.

5. The insulation preform of claim 4, wherein the first mean particle size is greater than or equal to about 0.15 mm and the second mean particle size is less than or equal to about 2.4 mm.

6. The insulation preform of claim 1, further comprising:

a first volume having a first density; and a second volume having a second density, wherein the second density is greater than the first density.

7. The insulation preform of claim 6, wherein the preform includes a first surface and an opposite second surface, the first volume of the insulation preform being disposed adjacent to the first surface, the second volume of the insulation preform being disposed adjacent to the second surface.

* * * * *